June 29, 1926.
H. F. GORDON
1,590,503
ECONOMIZER FOR INTERNAL COMBUSTION ENGINES
Filed Sept. 20, 1923
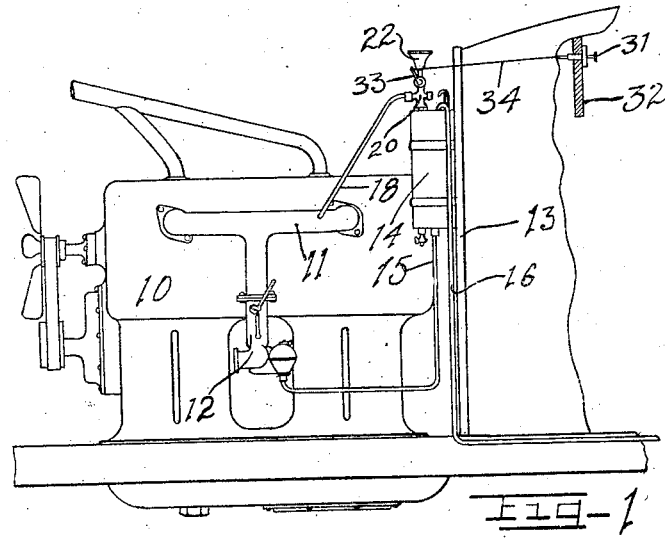
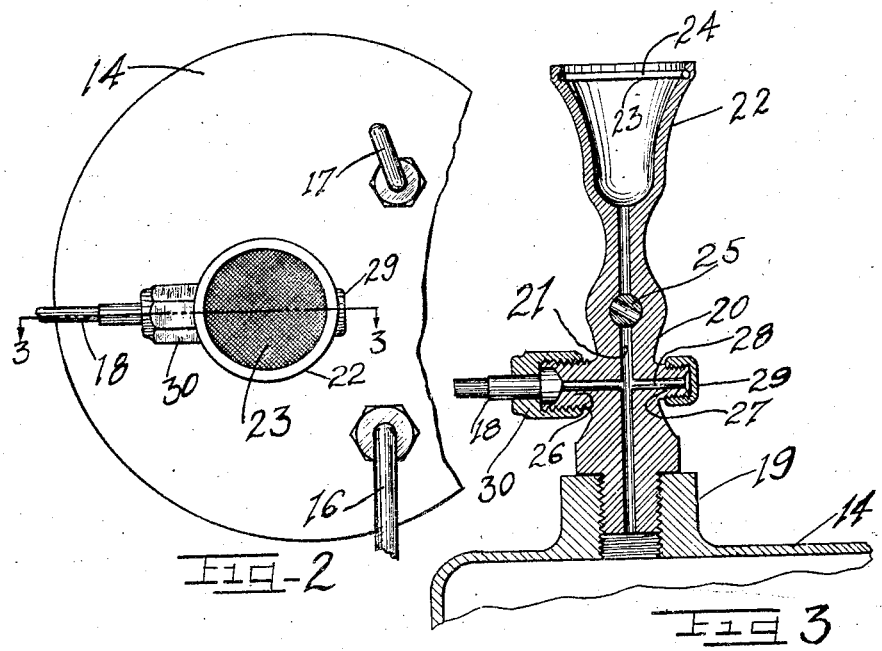
Inventor
Henry F. Gordon Patented June 29, 1926.

1,590,503

UNITED STATES PATENT OFFICE.

HENRY F. GORDON, OF CHICAGO, ILLINOIS.

ECONOMIZER FOR INTERNAL-COMBUSTION ENGINES.

Application filed September 20, 1923. Serial No. 663,877.

This invention relates to economizers for gas engines of the type wherein additional air is admitted to the inlet manifold of internal combustion engines to reduce the richness of the fuel mixture both through the additional air supply and through a decrease in the suction on the carburetor.

It is an object of this invention to provide a device of the class described which can be mounted on the vacuum tank and be used as a part of the regular equipment, thereby avoiding the expense and trouble of providing a separate connection to the inlet manifold.

It is also an object of this invention to provide a filler cup on the connection whereby if the vacuum tank should become empty it may be easily and quickly filled.

It is a further object of this invention to provide a device that can be adjusted from the driver's seat so that the most economical operating conditions may be obtained over a widely varying range of power and speed requirements.

Other and further important objects of this invention will be apparent from the disclosures in the specification and accompanying drawings.

This invention (in a preferred form) is illustrated in the drawings and hereinafter more fully described.

On the drawings:

Fig. 1 is an elevation of an automobile engine in place on a chassis, together with a vacuum tank mounted on the dash.

Fig. 2 is an enlarged top view of the vacuum tank of Fig. 1.

Fig. 3 is a section on the line 3—3 of Fig. 2.

As shown on the drawings:

An automobile engine is indicated by the reference numeral 10, having an intake manifold 11 and carburetor 12. Mounted on the dash 13 is a vacuum tank 14 of well known construction having a fuel pipe 15 leading to the carburetor and a fuel supply line 16 from the main tank is shown leading to the top of the vacuum tank. Also indicated on the tank is a customary air vent 17. Such vacuum tanks have an air line 18 leading from the inlet manifold to an elbow union (not shown) inserted in a boss 19 on the top of the tank.

The device of this invention is intended to be inserted in the boss 19 in place of the ordinary union, and comprises a branched pipe connection body 20 having a longitudinal aperture 21 leading from a cup 22 on its upper end. The cup is covered with a fine mesh strainer 23 retained in place by a spring ring 24. A cock 25 is arranged in the aperture 21 to regulate the rate of air admission therethrough. The oppositely disposed bosses or branches 26 and 27 have a cross aperture 28 intersecting the longitudinal aperture 21. The boss 27 is shown sealed by a cap 29 and is intended to serve to connect up a vacuum windshield wiper when such an apparatus is used. The boss 26 is provided with a union terminal 30 to receive the air pipe 18 from the inlet manifold.

The cock 25 is adjustable from the driver's seat by means of a push and pull button 31 mounted on the instrument board 32 of the automobile and connected to a lever 33 on the cock stem by means of a Bowden wire or stiff wire control rod 34.

In use the cock is regulated by means of the dash button to give a maximum supply of air to the manifold consistent with proper motor performance. For example, when starting the motor the cock must be entirely closed to produce the maximum suction at the carburetor. At road speeds on the other hand the cock can be nearly wide open, resulting in an appreciable dilution of the fuel mixture which will have a very pronounced effect on the economy or mileage to the gallon of fuel. If the vacuum tank should fail to function, as sometimes happens due to float or valve trouble, the tank may be filled by opening the cock and pouring a supply of fuel into the cup.

I am aware that numerous details of construction may be varied through a wide range without departing from the principles of this invention, and I therefore do not purpose limiting the patent granted otherwise than necessitated by the prior art.

I claim as my invention:

1. An economizer for an internal combustion engine equipped with a vacuum fuel tank, comprising a branched pipe connection body adapted to be attached to the vacuum connection of the tank, a pipe connection from one branch of said body to the intake manifold of the engine, a combined priming cup and air bleed connected to another branch of said body, and a valve in said body controlling only said priming cup and air bleed connection.

2. An economizer for an internal combustion engine equipped with a vacuum feed fuel tank, comprising a four-way pipe connection body adapted to be connected to the vacuum connection of the tank, a pipe connection from one branch of said body to the intake manifold of the engine, a priming cup and air bleed connected to another branch of said body, and a valve controlling only said priming cup and air bleed connection, the remaining branch of said body being adapted to provide a power take-off connection for other vacuum operated apparatus.

In testimony whereof I have hereunto subscribed my name.

HENRY F. GORDON.